(12) United States Patent
Wu et al.

(10) Patent No.: US 6,275,237 B1
(45) Date of Patent: Aug. 14, 2001

(54) STRUCTURAL GRAPH DISPLAY SYSTEM

(75) Inventors: Fu-Sheng Wu, Taoyuan; Yi-Hui Huang, Taipei Hsien, both of (TW)

(73) Assignee: Arphic Technology Co., Ltd., Taipei (TW)

( * ) Notice: Subject to any disclaimer, the term of this patent is extended or adjusted under 35 U.S.C. 154(b) by 0 days.

(21) Appl. No.: 09/163,337

(22) Filed: Sep. 30, 1998

(51) Int. Cl.$^7$ .................................................. G09G 5/22
(52) U.S. Cl. ......................... 345/440; 345/192; 345/194; 345/141; 345/467
(58) Field of Search .................................. 345/116, 467, 345/471, 141, 16, 17, 23, 24, 133, 145, 146, 140, 192, 194, 440; 707/535, 541; G09G 5/22

(56) References Cited

U.S. PATENT DOCUMENTS

| | | | | |
|---|---|---|---|---|
| 4,852,019 | * | 7/1989 | Vinberg | 345/440 |
| 4,990,903 | * | 2/1991 | Cheng | 345/471 |
| 5,212,769 | * | 5/1993 | Pong | 345/467 |
| 5,771,048 | * | 6/1998 | Nankou | 345/471 |
| 5,923,321 | * | 7/1999 | Huang | 345/141 |

* cited by examiner

*Primary Examiner*—Matthew Luu
*Assistant Examiner*—Wesner Sajous
(74) *Attorney, Agent, or Firm*—Winston Hsu

(57) ABSTRACT

A structural graph displaying system for generating a new structural graph by changing sub-graphs of an existent structural graph. The displaying system includes a drawing control program for controlling the drawing process of a character, a contour changing program for changing the contour of a stroke along a contour changing direction, and a graph integration program for integrating and outputting the changed contours of all strokes of a character onto a screen. The displaying system further includes a stroke table for storing a stroke ID and corresponding stroke drawing program of each stroke, and a character description file for storing various stroke parameters of each character. The character description file includes an index file and a stroke description table of each character. The index table contains a WID of each character and the addresses of the correspondent stroke description tables. The stroke description table is used for recording the stroke data of all strokes, such as the stroke ID, key points, and widths. The character description file further includes a contour change description file for recording various changing rules and parameters based on which of the contours of a stroke is changed.

7 Claims, 8 Drawing Sheets

| ID 7 | X1 | Y1 | X2 | Y2 | X3 | Y3 | W1 | W2 |

| ID 0 | Stroke Generation Program 0 |
| ID 0 | Stroke Generation Program 1 |
| ...... | ...... |

| New Font ID | New Font Name | Original Font ID | Change Type Parameter | | | | | | Direction Parameter | |
|---|---|---|---|---|---|---|---|---|---|---|
| | | | Parameter | | | | | | Direction | Interval |
| | | | 1 | 2 | 3 | 4 | 5 | ... | | |
| 11 | Ink Type Font | 2 | 3 | 0 | 3 | 5 | 20 | | | |
| 12 | Bamboo-like Font | 1 | 3 | 0 | 2 | 30 | 15 | | | |
| 13 | Black Saw-tooth Font | 3 | 1 | 0 | 6 | 15 | 100 | | | |
| 14 | Folding Stroke Font | 3 | 3 | 2 | 5 | 30 | 15 | | | |
| | | | | | | | | | | |

| Font ID | Font Name |
|---|---|
| 1 | Ming Font |
| 2 | Kei Font |
| 3 | Black Font |
| ... | ... |

| Parameter ID | Change Name |
|---|---|
| 1 | Side Decision Parameter |
| 2 | Over Lapping Parameter |
| 3 | Variation Parameter |
| 4 | First Change Control Parameter |
| 5 | Second Change Control Parameter |

| | |
|---|---|
| 0 | Normal |
| 1 | Left Side |
| 2 | Right Side |
| 3 | Both Sides |
| | |

| | |
|---|---|
| 0 | Normal |
| 1 | Folding |
| 2 | Folding White Stroke Change |
| 3 | |
| 4 | |

| | |
|---|---|
| 0 | Normal |
| 1 | Wheel Change |
| 2 | Bamboo Change |
| 3 | Ink Change |
| 4 | Gear Change |
| 5 | Twirl Change |
| 6 | Saw-tooth Change |
| 7 | |

FIG. 7

Ink Type Font
Bamboo-like Font
Black Saw-tooth Font
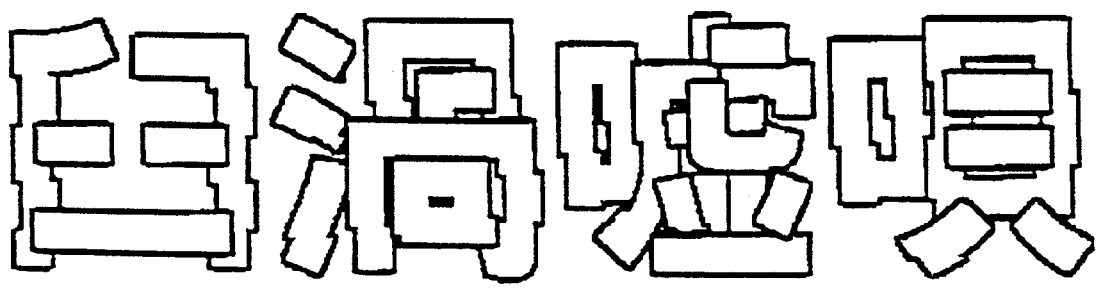
Folding Stroke Font
FIG. 8

STRUCTURAL GRAPH DISPLAY SYSTEM

BACKGROUND OF THE INVENTION

1. Field of the Invention

The present invention relates to a structural graph display system, and more particularly, to a structural graph display system for generating a new structural graph by changing sub-graphs of an existent structural graph.

2. Description of the Prior Art

At present, high quality Chinese characters are commonly formed by using a stroke-combined character technique wherein each Chinese character is considered a structural graph formed by a plurality of strokes, each stroke being a sub-graph formed by its individual contour. Although the varieties of strokes used in forming Chinese characters are few, the length, thickness and orientation of like strokes differ based on their placement within the word. Despite these differences, the contour of any stroke, such as the stroke, ———, remains relatively constant. Thus, if the length, angle, key point(s) and stroke width(s) of one stroke can be determined separately, the contour of the stroke can be easily drawn by executing a generation program.

Basically, each stroke has a fixed number of key points and stroke widths, and each stroke can be drawn by a stroke generation program. The stroke generation program is written by Graphic description language, and can draw the contour of one stroke in a rectangular area according to each given key point and stroke width. Each character is a combination of individual strokes sequentially drawn in a rectangular area by executing the stroke generation program of each stroke.

Please refer to FIG. 1 FIG. 1 shows a data structure of a prior art stroke table 10. Each stroke on the stroke table 10 has a stroke ID 12 and a stroke generation program 14. The computer system draws the contour of the stroke in a rectangular area using the stroke generation program corresponding to the stroke ID and using the key point(s) and stroke width(s) parameters of the stroke.

Please refer to FIG. 2 and FIG. 3. FIG. 2 shows the contour of a stroke 20 and the position of each key point and stroke width. FIG. 3 shows a data structure 30 of the stroke 20. The stroke 20 has three key points (x1,y1), (x2, y2), (x3, y3) and two stroke widths w1,w2. The data structure 30 comprises a stroke ID (ID 7) of the stroke 20, the key positions and stroke widths.

Please refer to FIG. 4. FIG. 4 shows a data structure of a prior art character description file 40. The character description file 40 is used for storing the strokes contained within the character, and the stroke ID, key point, stroke width of each stroke. The character description file 40 contains an index table 42 and stroke description table 44 of each character. The index table 42 contains a word ID (WID) for each character and the address of the corresponding stroke description table 44. The stroke description table 44 is a combination of the data structures of all strokes of a character. Like the data structure 30 shown in FIG. 3, the stroke description table 44 comprises the stroke data of all strokes: stroke IDs, key points, and stroke widths. The stroke data are arranged in a predetermined order, such as the writing sequence. When drawing a character, the computer system can locate the stroke description table 44 of the character by using the index table 42 of the stroke description table 44 as long as the word ID of the character is known. Afterward, the computer system will draw all strokes of the character one by one in a rectangular area in conjunction with the stroke table 10.

An operational stroke-combined character technique must have good contour information. This includes both an index table to indicate which strokes constitute a character and a stroke description table to indicate key points and stroke width of each stroke. To determine this data, each character must be written on paper and then digitized stroke by stroke so as to analyze parameters of all key points and stroke widths and accordingly build the index table and character description table. Since each character of a new font must be equipped with a stroke table and character description table and a Chinese font commonly contains about fourteen thousand characters, producing a new font may take about half a year to ensure that the stroke-combined character technique is functional. This is a time consuming process and as such there is a dearth of fonts available.

SUMMARY OF THE INVENTION

It is therefore a primary objective of the present invention to provide a structural graph display system for generating a new structural graph rapidly by changing the sub-graphs of an existent structural graph to solve the above mentioned problem.

In a preferred embodiment, the present invention provides a structural graph display system comprising a memory for storing data and programs, a processor for executing the programs stored in the memory, and a predetermined area for displaying a structural graph; each of the structural graphs being formed by at least one sub-graph, each sub-graph comprising a plurality of sub-graph parameters for defining the sub-graph and a correspondent sub-graph drawing program stored in the memory for drawing the sub-graph in the predetermined area according to the sub-graph parameters; each structural graph being formed by drawing all its sub-graphs one by one in the predetermined area; each sub-graph drawn in the predetermined area having a contour; characterized in:

a contour changing program stored in the memory for changing the contour of a sub-graph along a predetermined contour changing direction according to a predetermined changing rule;

wherein when a drawing a structural graph in the predetermined area, the contour changing program is used to change the contours of all sub-graphs of the structural graph so as to create orderly changes over the contours of all the sub-graphs of the structural graph along the predetermined contour changing direction.

It is an advantage of the present invention that the structural graph displaying system generates a new font without producing a stroke table and correspondent character description table thus saving time and labor.

It is another advantage of the present invention that since the structural graph displaying system generates a new font by changing contours of characters of an existent font and there are innumerable variations in contour features that can be made, many new fonts can be easily generated.

These and other objectives of the present invention will no doubt become obvious to those of ordinary skill in the art after reading the following detailed description of the preferred embodiment which is illustrated in the various figures and drawings.

BRIEF DESCRIPTION OF THE DRAWINGS

FIG. 7 shows a data structure of the contour changing description table shown in FIG. 6.

FIG. 8 shows some characters of new fonts generated according to the present invention.

DETAILED DESCRIPTION OF THE PREFERRED EMBODIMENT

Figures 1, 2, 3:
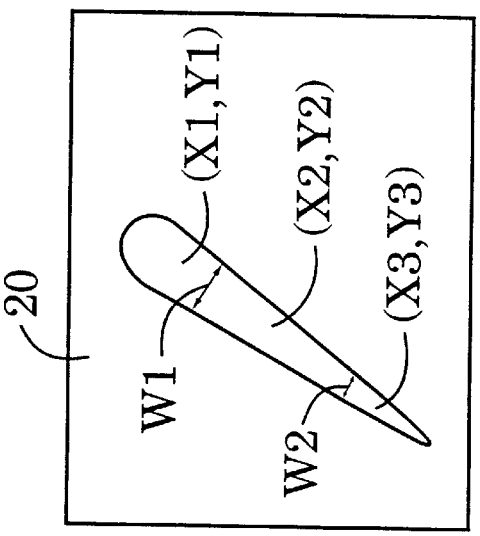
FIG. 1 shows a data structure of a stroke table according to the prior art.
FIG. 2 shows the contour of a stroke and the position of each key point and stroke width.
FIG. 3 shows a data structure of the stroke shown in FIG. 2.
Figure 4:
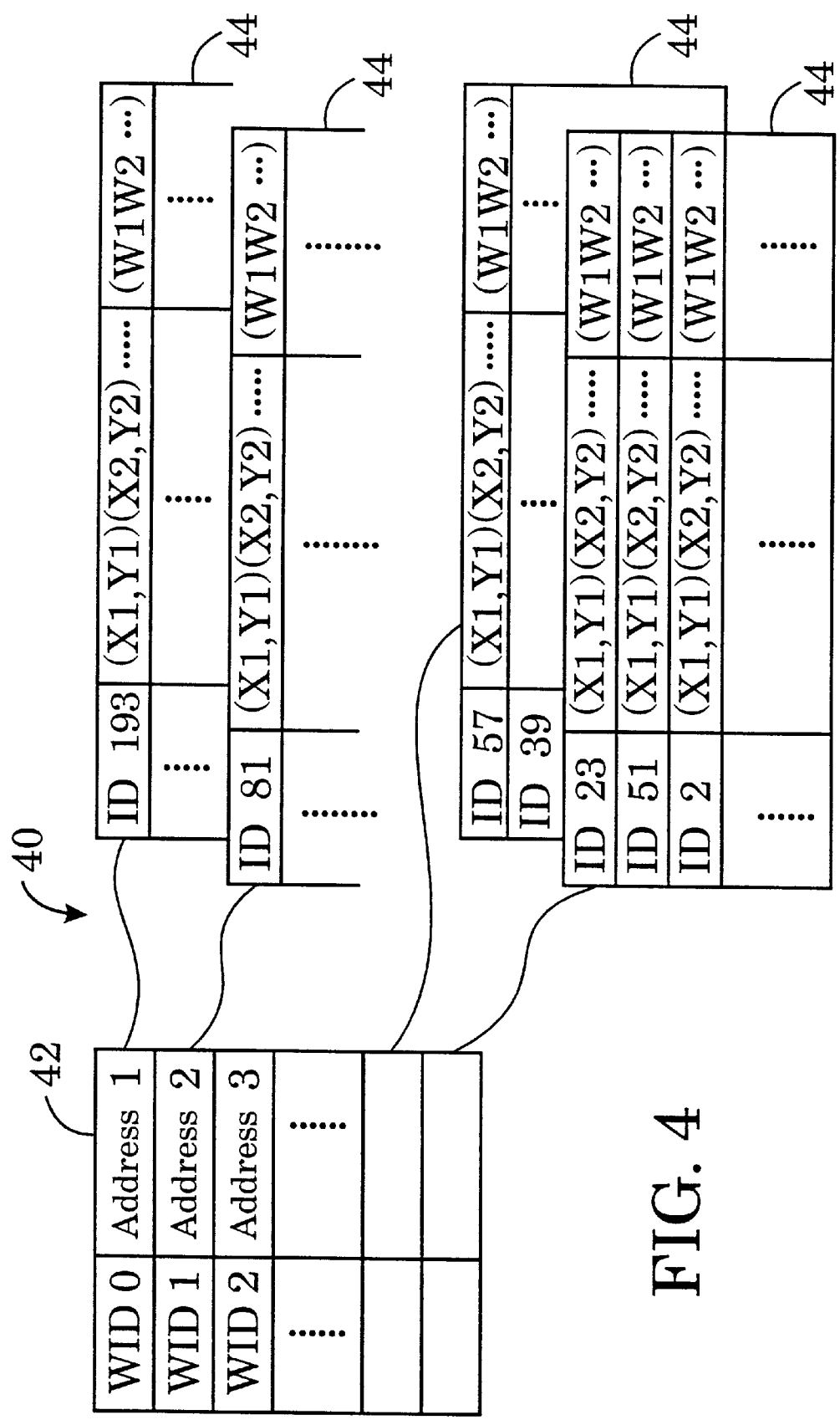
FIG. 4 shows a data structure of a prior art character description file.
Figure 5:
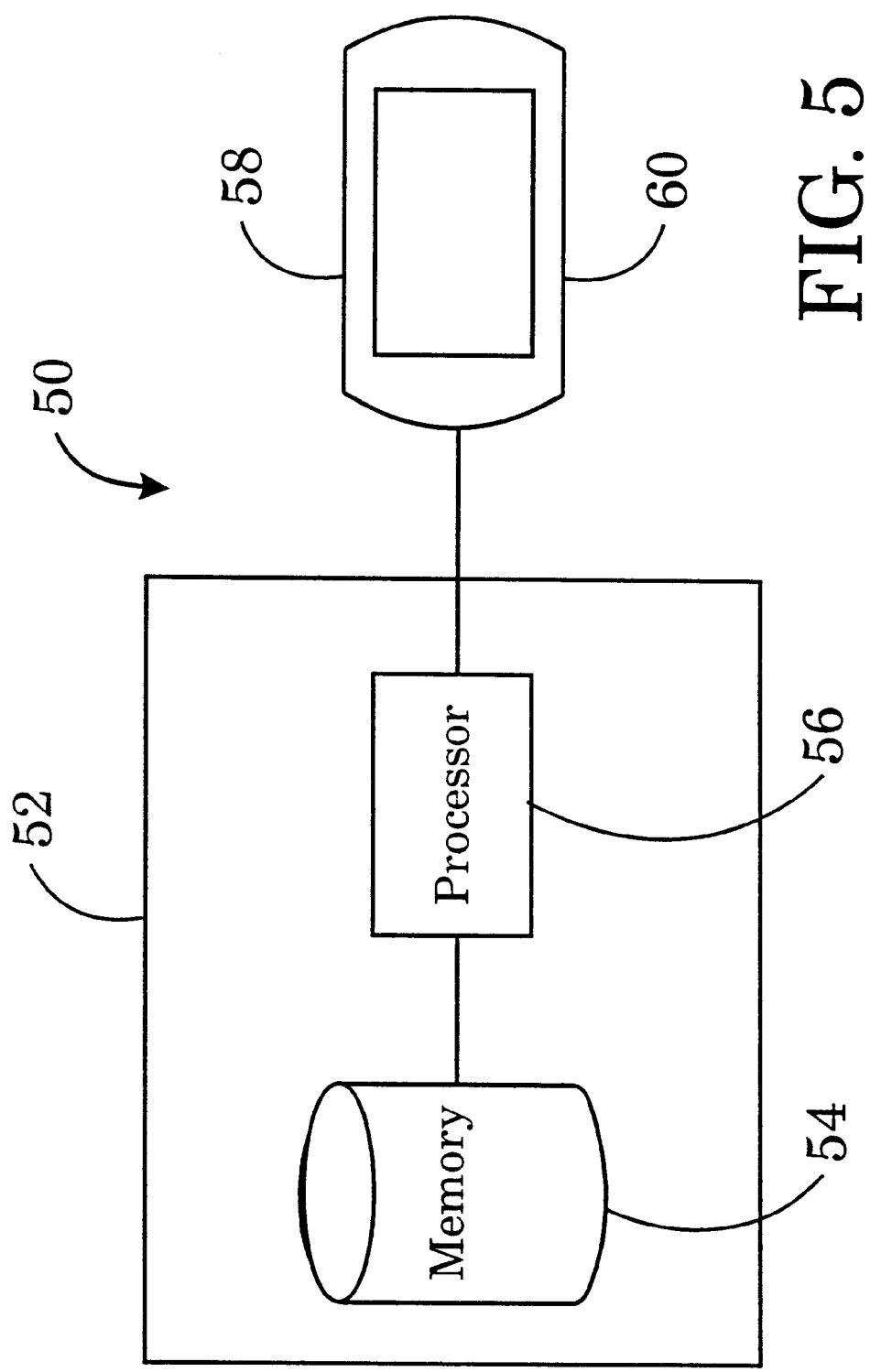
FIG. 5 is a block diagram of the hardware of a structural graph displaying system according to the present invention.

Please refer to FIG. 5. FIG. 5 is a block diagram of the hardware of a structural graph displaying system 50 according to the present invention. The structural graph displaying system 50 comprising a computer 52 and a monitor 58. The computer 52 comprises a memory 54 for storing data and programs, and a processor 56 for executing the programs stored in the memory. The monitor 58 comprises a screen 60 for displaying structural graphs, such as Chinese characters, generated by the computer 52

Figure 6:
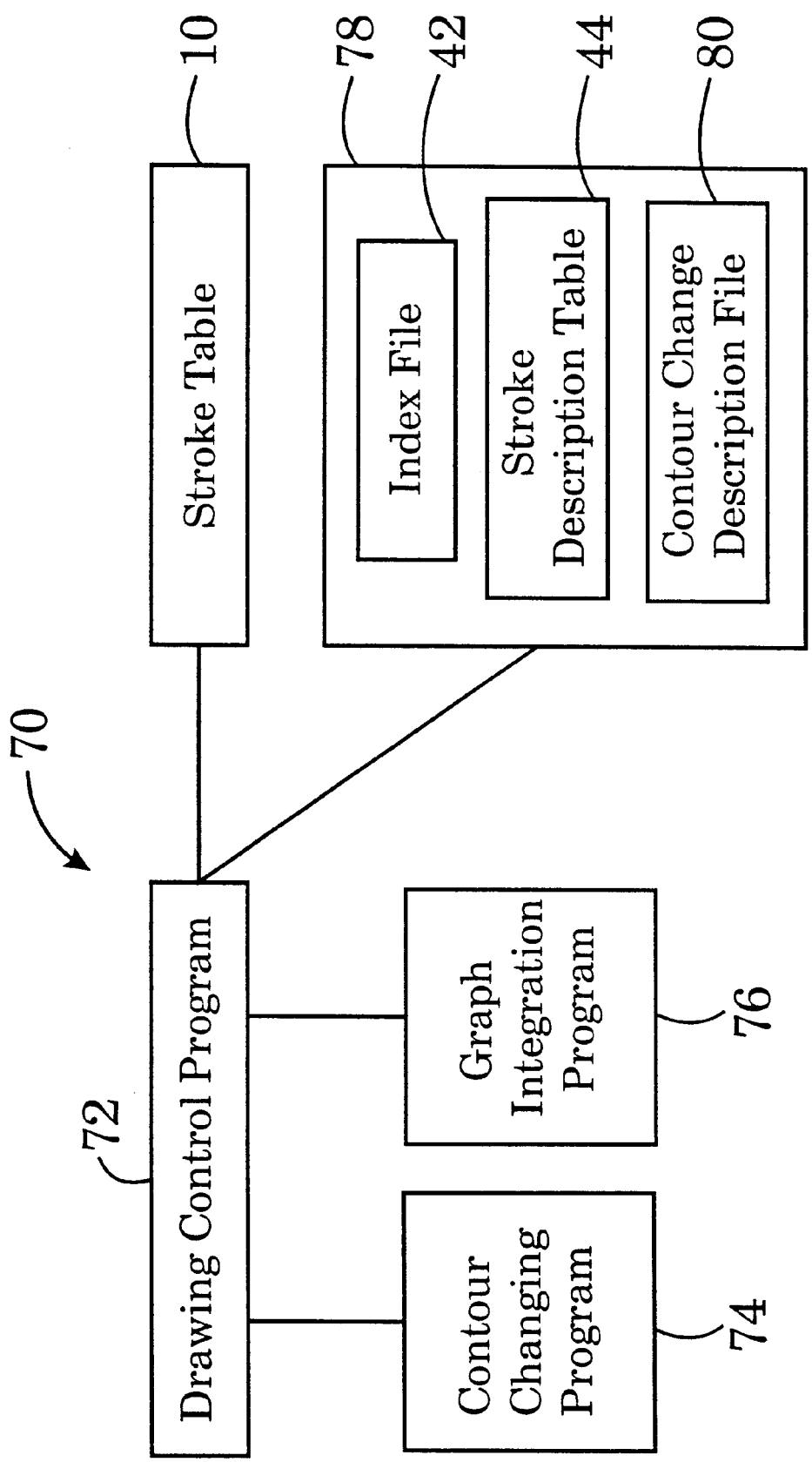
FIG. 6 is a block diagram of the software of the structural graph displaying system shown in FIG. 5.

Please refer to FIG. 6. FIG. 6 is a block diagram of the software 70 of the structural graph displaying system 50 shown in FIG. 5. The software 70 is stored in the memory 54 of the computer 52. It comprises a drawing control program 72 for controlling the drawing process of a character, a contour changing program 74 for changing the contour of a stroke along a contour changing direction according to a predetermined changing rule, and a graph integration program 76 for integrating and outputting the changed contours of all strokes of a character onto the screen 60. The software 70 further comprises a stroke table 10 for storing stroke IDs of each stroke and corresponding stroke drawing programs, and a character description file 78 for storing various stroke parameters of each character. The character description file 78 comprises an index file 42 and a stroke description table 44 of each character. The index table contains a WID of each character and the addresses of the correspondent stroke description tables 44. The stroke description table 44 is used for recording the stroke data of all strokes, such as the stroke ID, key points, and widths, etc., which are arranged in a predetermined sequence. The character description file 78 further comprises a contour change description file 80 for recording various changing rules and parameters based on which contour of a stroke is changed accordingly.

To generate a new character, the drawing control program 72 searches the character description file 78 for stroke data and changing parameters of the character according to the character's WID. Afterward, the drawing control program 72 uses the corresponding stroke drawing programs to draw the contours of all strokes according to the stroke data, and then uses the contour change description program 74 to change these contours according to the changing parameters. Finally, the drawing control program 72 passes the changed contours to the graph integration program 76 to integrate the changed contours so as to draw the changed structural graph in the predetermined area on the screen 60.

Please refer to FIG. 7. FIG. 7 shows a data structure of the contour change description file 80 shown in FIG. 6. The contour change description file 80 comprises a change description file 82, an original font index table 84, a change parameter index table 86, and a plurality of change parameter description tables 88. The change description file 82 comprises a new font ID 90, a new font name 92, a original font ID 94, a plurality of change type parameters 96, and a direction parameter 98 of each new font. The direction parameter 98 is used to determine which points on the contours of a character are changed and along which direction they are changed. The change type parameters 96 are used to determine how to change chosen contour points. The structural graph displaying system 50 generates a new font by modifying an original font according to the change type parameters 96 and the direction parameter 98. The original font ID index table 84 comprises a font ID and the corresponding font name of each original font. The change parameter index tables 86 comprises a plurality of change type parameter IDs and corresponding contour change names. The change parameter description tables 88 is used for recording various contour change methods. When the contour changing program 74 changes the contour of a stroke, it determines pairs of points on the contour along a given contour changing direction and a given interval apart according to the direction parameter 98 and the change type parameters 98, and then changes symmetrically the ordinates of the chosen pairs of contour points.

Figure 9:
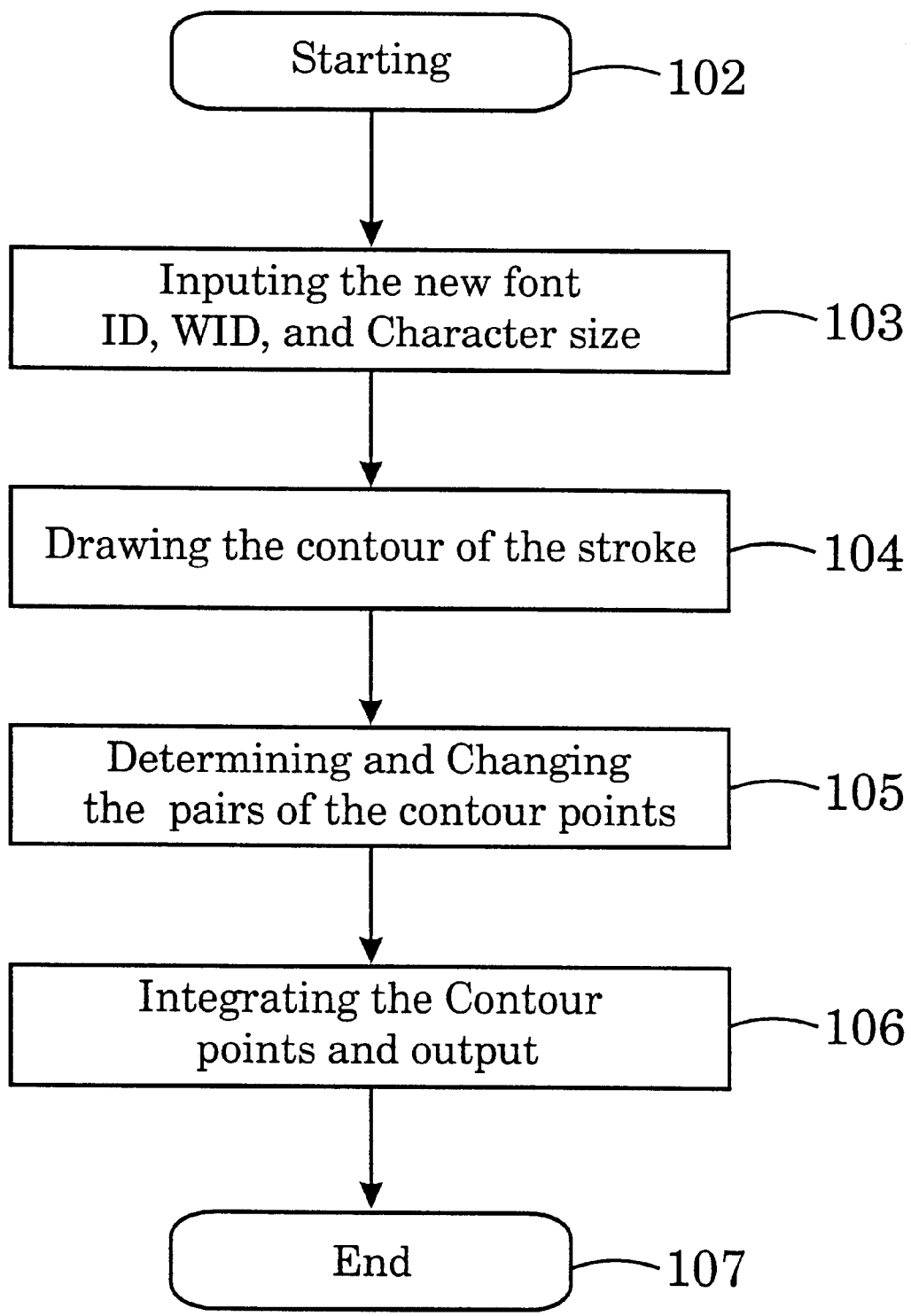
FIG. 9 is a flowchart for generating the characters shown in FIG. 8.

Please refer to FIG. 8 and FIG. 9. FIG. 8 shows some characters of four new fonts generated according to the present invention. FIG. 9 is a flowchart 100 for generating the characters shown in FIG. 8. The four new fonts shown in FIG. 8 include ink style font, bamboo-like font, black saw-tooth font, and folding stroke font. The flowchart 100 comprises following steps:

step 102: starting;

step 103: inputting the new font ID 90, WID, and character size of a desired character;

step 104: searching the contour change description file 80 for the correspondent original font ID 94 based on the input new font ID, searching the character description file 78 for the stroke data of all strokes of the desired character based on the original font ID 94 and WID, calling the correspondent stroke drawing program to draw the contours of each stroke based on the stroke data of each stroke, and then calling the contour change program 74 to change the contours using the drawing control program 72;

step 105: determining the pairs of the contour points along a contour changing direction based on the direction parameters 98 of the change description table 80, and symmetrically changing the pairs of the contour points based on the change type parameters 96 using the contour change program 74;

step 106: integrating each changed pair of the contour points and outputting the new character to the screen 60 of the monitor 58 using the graph integration program 76;

step 107: end.

Figure 10:
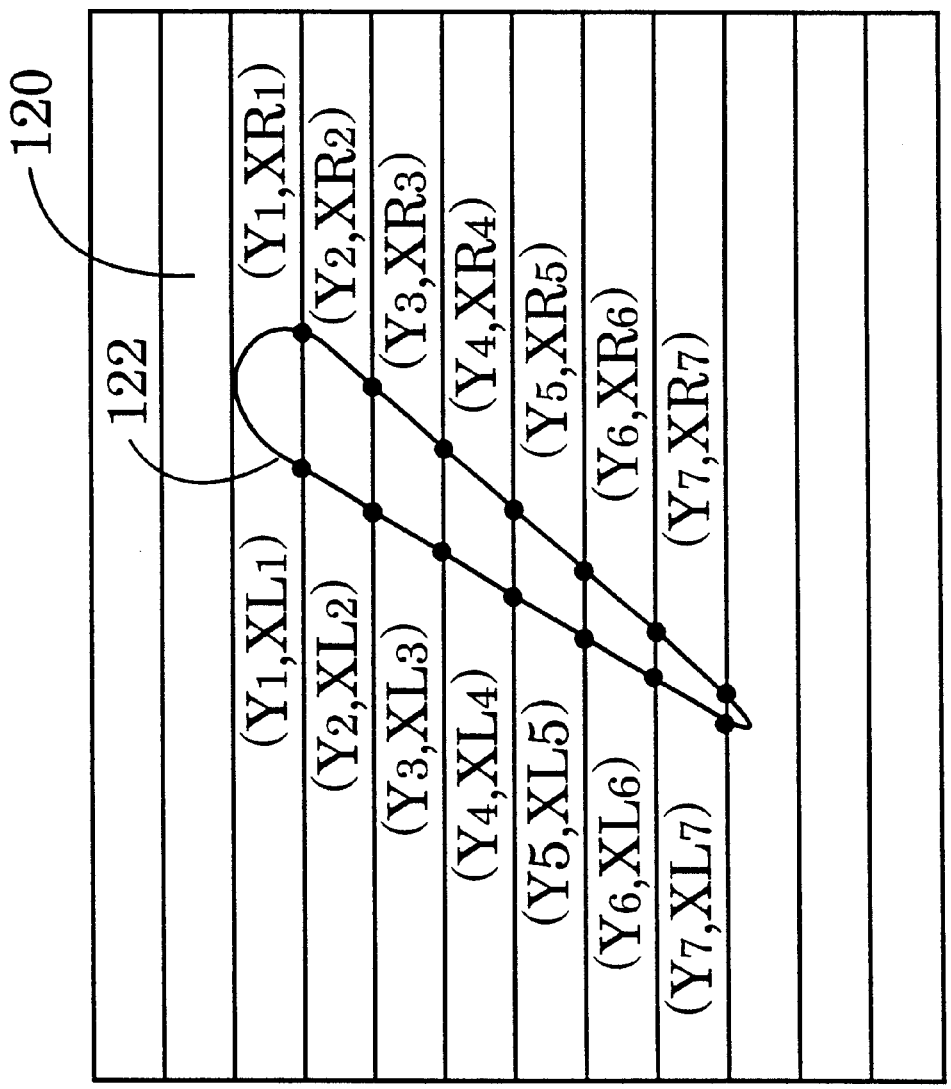
FIG. 10 shows the contour of a stroke and the position of each contour point along a given contour changing direction.

Please refer to FIG. 10. Using the first stroke 120  of the first Chinese character 日 of the ink style font shown in FIG. 8 as an example of specifying a change of the contour of each stroke in step 108, FIG. 10 shows the contour of the stroke 120 and the position of chosen contour points along a horizontal direction. When the font ID of ink style font, the WID of the Chinese character, 日, and the desired character size are input, the drawing control program 72 searches the contour change description file 80 within the character description file 78 for the original font, then accordingly searches the character description file 78 for the index table 42 of the original font as well as the stroke description table 44 for the stroke ID, key points, and width of the stroke 120. Based on the stroke ID, the correspondent stroke description program is located in the stroke table 10 and used to draw the contour of the stroke 120. Then, the contour change program 74 is called to change the contour. It is shown in FIG. 10 that the contour change program 74 uses several horizontal lines drawn at fixed intervals to locate seven pairs of symmetrical contour points 122. Afterward, the contour change program 74 sequentially changes the ordinates of the contour points 122 horizontally according to the change type parameters 96.

Parameter 1 of the change type parameters 96 is a side decision parameter indicating changes to contour points on the right side, left side, or both sides. Parameter 2 is an overlapping parameter indicating whether the strokes of a character are overlapping. Parameter 3 is a variation parameter indicating which rule or formula is used to change the coordinates of the contour points. Parameter 4 and 5 are first and second change control parameters indicating the constant used in the formula determined by parameter 3. For example, the first five parameters of the ink style font are 3,0,3,5,20 which means simultaneously changing the contour points 122 on both the right and the left sides, no overlapping of strokes, and using ink style variation. Using ink style variation means adapting the following formula to change the coordinates of the contour points 122:

$$XL = XL\text{-random number (character size*parameter 4/100)}$$

$$XR = XR\text{-random number (character size*parameter 5/100)}$$

wherein the parameter 4 is 5 and the parameter 5 is 20.

The change type parameter 96 of the change description table 82 further comprises a parameter for the contour change program 74 to prevent excessive changes to the contour points 122 by controlling the amount of changes performed.

After the contour change program 74 changes the coordinates of the seven pairs of contour points 122 according to the above formula, the graph integration program 76 integrates the changed coordinates and draws the newly formed character onto the screen 60 of the monitor 58. It can be seen from the above mentioned formula and procedure that the ink style font with a coarse contour and Chinese calligraphic style is formed by expanding the contour points outward to a random distance separated by fixed intervals. If the random number mentioned in above formula is changed to a constant, the direction of the horizontal lines are changed to another direction, the fixed intervals between each pair of contour points are changed to variable intervals, or the original font is changed to other fonts, and a new font which is different from the ink style font will be formed.

Compared with the prior art new font generation method of forming a new font by building key points, widths, and stroke description programs stroke by stroke, the structural graph displaying system 50 of the present invention generates a specific new font simply by changing the contour features of an existent font. This not only saves a lot of time, but also enables the production of a vast array of new fonts.

Those skilled in the art readily observe that numerous modifications and alterations of the device may be made while retaining the teachings of the invention. Accordingly, the above mentioned disclosure should be construed as limited only by the metes and bounds of the appended claims.

What is claimed is:

1. A structural graph display system comprising a memory for storing data and programs, a processor for executing the programs stored in the memory, and a predetermined area for displaying a structural graph; each of the structural graphs being formed by at least one sub-graph, each sub-graph comprising a plurality of sub-graph parameters for defining the sub-graph and a correspondent sub-graph drawing program stored in the memory for drawing the sub-graph in the predetermined area according to the sub-graph parameters of the sub-graph; the parameters of all the sub-graphs of each structural graph are stored in a graph description file; each structural graph being formed by drawing each of its sub-graphs one by one in the predetermined area; each sub-graph drawn in the predetermined area having a contour; characterized in:

the system further comprises:
a contour changing program stored in the memory for changing the contour of a sub-graph along a predetermined contour changing direction according to a predetermined changing rule, wherein when drawing a structural graph in the predetermined area, the contour changing program is used to change the contours of all sub-graphs of the structural graph so as to create orderly changes over the contours of all the sub-graphs of the structural graph along the predetermined contour changing direction;
a graph integration program stored in the memory for integrating contours of all the sub-graphs of a structural graph and drawing the structural graph in the predetermined area; and
a drawing control program for controlling the drawing process of the structural graph;
wherein the drawing control program searches the graph description file for the parameters of all the sub-graphs of one structural graph according to a word ID of the, structural graph, passes the parameters of each of the sub-graphs to a correspondent sub-graph drawing program to generate the contours of each sub-graph of the structural graph, passes the contours of each sub-graph to the contour change program to change the contours, and then passes the changed contours of each sub-graph to the graph integration program to integrate the changed contours so as to draw the changed structural graph in the predetermined area.

2. The structural graph displaying system of claim 1 wherein each structural graph comprises a direction parameter and a change type parameter stored in the graph description file, and wherein the contour change program uses the direction parameter to determine the contour changing direction and uses the change type parameter to determine the contour change rule.

3. The structural graph displaying system of claim 1 wherein the structural graph is a character having at least one stroke which defines the sub-graph of the structural graph.

4. The structural graph displaying system of claim 1 wherein when the contour change program changes the contour of a sub-graph, it prevents excessive changes by using a predetermined total change amount parameter to control the amount of the change over the contour.

5. The structural graph displaying system of claim 1 wherein when the contour change program changes the contour of a sub-graph, it chooses pairs of points on the contour along the contour changing direction and symmetrically changes each pair of contour points.

6. A structural graph display system comprising a memory for storing data and programs, a processor for executing the programs stored in the memory, and a predetermined area for displaying a structural graph; each of the structural graphs being formed by at least one sub-graph, each sub-graph comprising a plurality of sub-graph parameters for defining the sub-graph and a correspondent sub-graph drawing program stored in the memory for drawing the sub-graph in the predetermined area according to the sub-graph parameters of the sub-graph; each structural graph being formed by drawing each of its sub-graphs one by one in the predetermined area; each sub-graph drawn in the predetermined area having a contour; characterized in:

> a contour changing program stored in the memory for changing the contour of a sub-graph along a predetermined contour changing direction according to a predetermined changing rule;
>
> wherein when drawing a structural graph in the predetermined area, the contour changing program is used to change the contours of all sub-graphs of the structural graph so as to create orderly changes over the contours of all the sub-graphs of the structural graph along the predetermined contour changing direction, when the contour change program changes the contour of a sub-graph, it prevents excessive changes by using a predetermined total change amount parameter to control the amount of the change over the contour.

7. A structural graph display system comprising a memory for storing data and programs, a processor for executing the programs stored in the memory, and a predetermined area for displaying a structural graph; each of the structural graphs being formed by at least one sub-graph, each sub-graph comprising a plurality of sub-graph parameters for defining the sub-graph and a correspondent sub-graph drawing program stored in the memory for drawing the sub-graph in the predetermined area according to the sub-graph parameters of the sub-graph; each structural graph being formed by drawing each of its sub-graphs one by one in the predetermined area; each sub-graph drawn in the predetermined area having a contour; characterized in:

> a contour changing program stored in the memory for changing the contour of a sub-graph along a predetermined contour changing direction according to a predetermined changing rule;
>
> wherein when drawing a structural graph in the predetermined area, the contour changing program is used to change the contours of all sub-graphs of the structural graph so as to create orderly changes over the contours of all the sub-graphs of the structural graph along the predetermined contour changing direction, when the contour change program changes the contour of a sub-graph, it chooses pairs of points on the contour along the contour changing direction and symmetrically changes each pair of contour points.

* * * * *